(12) United States Patent
Seko et al.

(10) Patent No.: US 7,791,736 B2
(45) Date of Patent: Sep. 7, 2010

(54) POSITION MEASUREMENT SYSTEM

(75) Inventors: Yasuji Seko, Kanagawa (JP); Yoshinori Yamaguchi, Kanagawa (JP); Yasuyuki Saguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/458,867

(22) Filed: Jul. 24, 2009

(65) Prior Publication Data
US 2009/0310142 A1 Dec. 17, 2009

Related U.S. Application Data

(62) Division of application No. 11/450,265, filed on Jun. 12, 2006, now Pat. No. 7,583,388.

(30) Foreign Application Priority Data

Dec. 13, 2005 (JP) ............................. 2005-358687

(51) Int. Cl.
*G01B 11/02* (2006.01)
(52) U.S. Cl. ..................................... 356/498
(58) Field of Classification Search ................. 356/498, 356/499
See application file for complete search history.

(56) References Cited

U.S. PATENT DOCUMENTS

| 3,702,477 | A |   | 11/1972 | Brown |  |
|---|---|---|---|---|---|
| 3,740,152 | A |   | 6/1973 | Iisuka |  |
| 3,848,509 | A | * | 11/1974 | Corn | ........................ 89/41.22 |
| 3,889,108 | A |   | 6/1975 | Cantrell |  |
| 4,004,729 | A | * | 1/1977 | Rawicz et al. | ................ 235/404 |
| 4,025,721 | A |   | 5/1977 | Graupe et al. |  |
| 4,049,958 | A |   | 9/1977 | Hartmann |  |
| 4,050,068 | A | * | 9/1977 | Berg et al. | ..................... 342/53 |
| 4,144,571 | A |   | 3/1979 | Webber |  |
| 5,612,883 | A |   | 3/1997 | Shaffer et al. |  |
| 6,088,103 | A | * | 7/2000 | Everett et al. | ................ 356/503 |
| 6,266,142 | B1 |   | 7/2001 | Júnkins et al. |  |
| 7,009,713 | B2 | * | 3/2006 | Seko et al. | ................... 356/498 |
| 7,274,461 | B2 | * | 9/2007 | Seko | .......................... 356/498 |
| 7,433,538 | B2 | * | 10/2008 | Kusakabe et al. | ............ 382/275 |

(Continued)

FOREIGN PATENT DOCUMENTS

JP  A-2004-28977  1/2004

OTHER PUBLICATIONS

U.S. Appl. No. 11/353,011.

(Continued)

*Primary Examiner*—Gregory J Toatley, Jr.
*Assistant Examiner*—Scott M Richey
(74) *Attorney, Agent, or Firm*—Oliff & Berridge, PLC

(57) ABSTRACT

A position measurement system for measuring positional coordinates of a point under measurement includes a first noise removal unit, a parameter determination unit and a second noise removal unit. The first noise removal unit removes noise from the measured positional coordinates to acquire first positional coordinate values. The parameter determination unit determines a noise removal parameter on a basis of the first positional coordinate values. The second noise removal unit again removes noise from the first positional coordinate values with using the noise removal parameter, to acquire second positional coordinate values.

4 Claims, 5 Drawing Sheets

U.S. PATENT DOCUMENTS

| | | | |
|---|---|---|---|
| 7,489,406 B2* | 2/2009 | Seko | 356/498 |
| 7,562,821 B2* | 7/2009 | Seko et al. | 235/454 |
| 7,633,628 B2* | 12/2009 | Seko | 356/498 |
| 2004/0004723 A1 | 1/2004 | Seko et al. | |
| 2005/0253806 A1 | 11/2005 | Liberty et al. | |

OTHER PUBLICATIONS

Welch et al; "An Introduction to the Kalman Filter"; UNC-Chapel Hill, TR 95-041; Jul. 24, 2006; pp. 1-16.

Bayless and Brigham, "Application of the Kalman filter to continuous signal restoration," Feb. 1970, Geophysics, vol. 35, No. 1, pp. 2-23.

Welch and Bishop, "SIGGRAPH 2001, Course 8: An Introduction to the Kalman Filter," 2001, accessed on Jun. 19, 2008 from http://www.cs.unc.edu/~{welch,bg}. Including relating papers: Maybeck, Chapter 1 "Introduction" from "Stochastic Models, Estimation, and Control," 1979, Academic Press, pp. 1-16. Welch and Bishop, "SCATT," 2001.

* cited by examiner

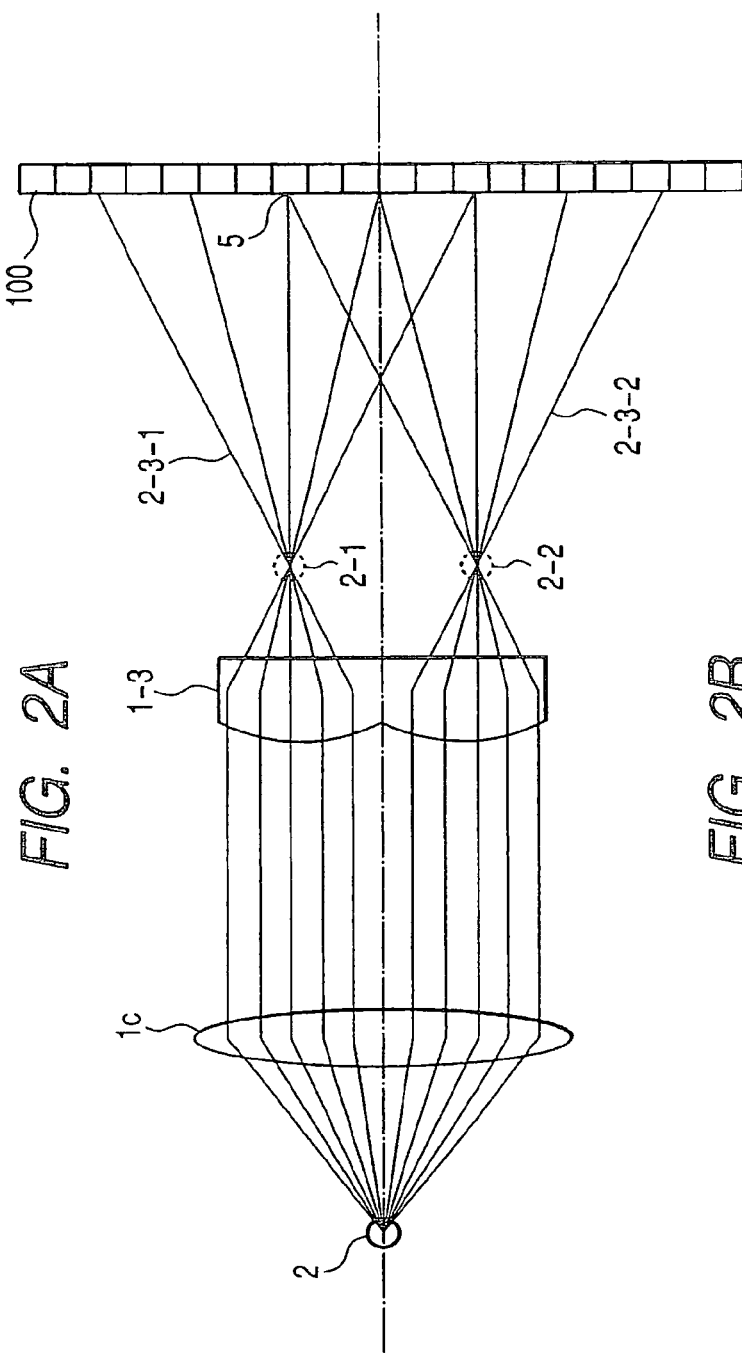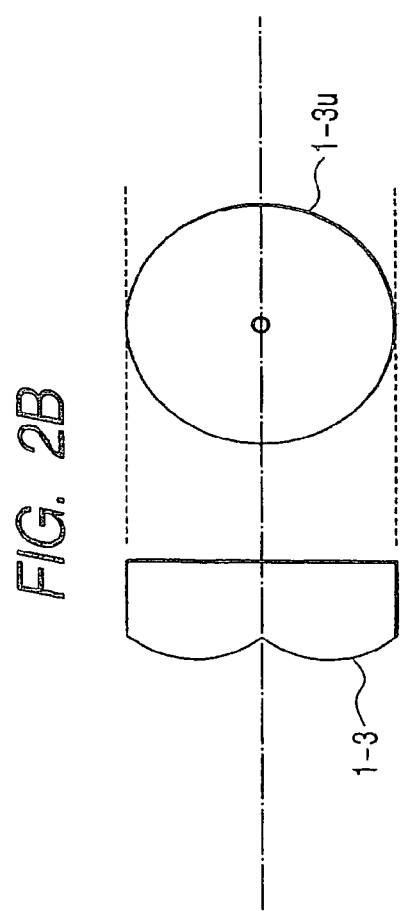

POSITION MEASUREMENT SYSTEM

CROSS-REFERENCE TO RELATED APPLICATIONS

This is a divisional of application Ser. No. 11/450,265 filed Jun. 12, 2006, now U.S. Pat. No. 7,582,388 which claims priority under 35 U.S.C. 119 from Japanese patent application No. 2005-358687 filed on Dec. 13, 2005. The disclosures of the prior applications are hereby incorporated by reference herein in their entirety.

Also, the disclosure of U.S. patent application Ser. No. 11/353,011 is incorporated by reference herein.

BACKGROUND

1. Technical Field

The invention relates to a position measurement system, which determines positional coordinates of a point under measurement (hereinafter called a "target point") by means of removing noise, which would cause a problem at the time of measurement of a position and a direction.

2. Related Art

Various position measurement systems have already been proposed.

SUMMARY

A position measurement system for measuring positional coordinates of a point under measurement includes a first noise removal unit, a parameter determination unit and a second noise removal unit. The first noise removal unit removes noise from the measured positional coordinates to acquire first positional coordinate values. The parameter determination unit determines a noise removal parameter on a basis of the first positional coordinate values. The second noise removal unit again removes noise from the first positional coordinate values with using the noise removal parameter, to acquire second positional coordinate values.

BRIEF DESCRIPTION OF THE DRAWINGS

Exemplary embodiments of the present invention will be described in detail based on the following figures, wherein:

FIG. 2A is a view showing an example of the configuration of a pointer, and FIG. 2B is a view showing an example of an interference lens;

DETAILED DESCRIPTION OF EMBODIMENTS

A position measurement system according to exemplary embodiments of the invention will be described hereinbelow by reference to the drawings.

Figure 1:
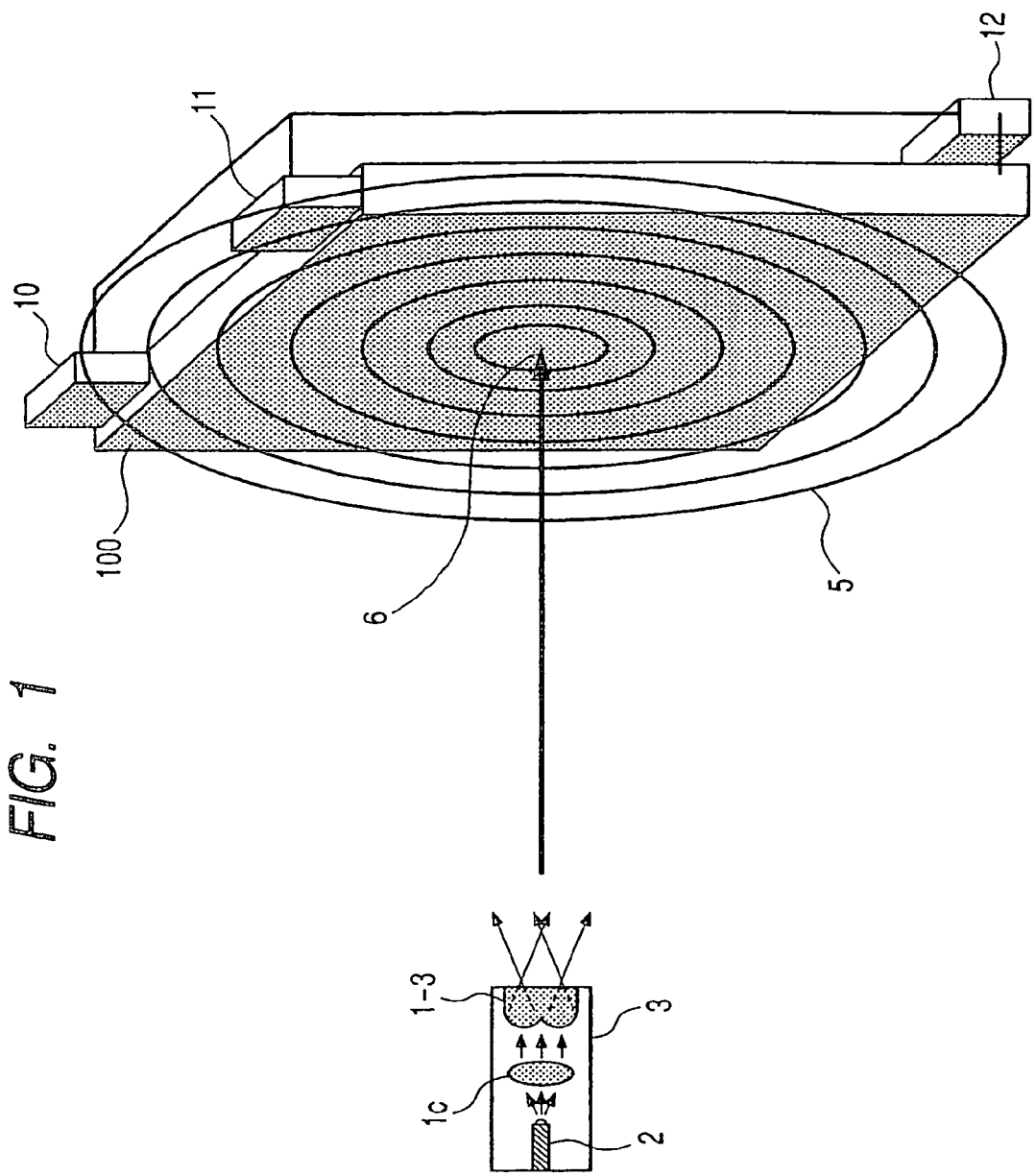
FIG. 1 is a view showing an example of a position measurement system for measuring positional coordinates of a target point.

FIG. 1 is a view showing an example of a position measurement system for measuring positional coordinates of a point under measurement (hereinafter called a "target point"). This system determines positional coordinates of an indicated point pointed by an indicator. As illustrated, this system includes a pointer 3 functioning as an indicator that projects light of a concentric interference pattern 5 (hereinafter called "interference-patterned light"); detectors 10, 11, each of which has an image sensor such as a CCD for detecting the interference-patterned light 5 projected by the pointer 3; and a computer 12, such as a personal computer (PC), functioning as a computing device that determines positional coordinates of a center (an indicated position) 6 of the interference-patterned light 5 projected on a display 100 on the basis of signals acquired from the detectors 10, 11. Although an example of the configuration of the pointer 3 will be described later, the pointer 3 includes a semiconductor laser 2, a collimator lens 1c, and an interference lens 1-3. The computer 12 is connected to the detectors 10, 11 and the display 100. The computer 12 processes detection signals output from the detectors 10, 11, to thereby be able to display the indicated position 6 of the pointer 3 as a cursor on a screen of the display 100 and move the cursor in accordance with movement of the pointer 3.

In this system, the computer 12 does not only determine the indicated position 6 of the pointer 3, but also eliminates noise from positional coordinates of the determined indicated position 6 to thus compute first positional coordinate values; again eliminates noise from the first positional coordinate values with using a noise removal parameter determined on the basis of the first positional coordinate values, to compute second positional coordinate values; and determines the indicated position of the pointer 3 on the basis of the second positional coordinate values. That is, when the Kalman filter is used, noise is removed by first filtering the measured values by means of the Kalman filter and determine true values (the first positional coordinate values). True variations in the target point are predicted from the true values, and a parameter value of another Kalman filter to be used next is set, noise is eliminated, and second positional coordinate values are obtained. Thereby, vibration of the indicated position 6, which are caused by physical vibration, such as shaking of the user's hand at the time a person operates the pointer 3, is restrained, and quick movement of the target point can be tacked. This will be described in detail later.

FIG. 2A is a view showing an example of the configuration of the pointer 3. FIG. 2B is a view showing an example of the interference lens 1-3. As shown in FIG. 2A, the pointer 3 includes the semiconductor laser 2, the collimating lens 1c and the interference lens 1-3. The semiconductor laser 2 functions as a light source and emits light having a wavelength of 850 nm. The collimator lens 1c collimates the light. The interference lens 1-3 irradiates with the collimated light as the concentric interference-patterned light 5. A ring-shaped lens, which has, e.g., a depression along the optical axis thereof and is symmetrical with respect to the optical axis thereof, is used as the interference lens 1-3. In FIG. 2B, the reference sign "1-3" indicates the cross-sectional profile of the interference lens 1-3, and the reference sign "1-3u" indicates a front view of the interference lens 1-3 when viewed from the light source. An outer diameter of the lens is assumed to be 3 mm. An incident surface of the lens 1-3 taken along the plane of the optical axis is formed from an aspherical plane of $x=0.5 \times (y-1.5)^{1.5}$ (in millimeters), where "x" designates the optical axis which becomes positive in the traveling direction of light, and "y" designates the radial axis perpendicular to the optical axis. A plane of the lens 1-3 from which light exits is formed into a flat plane. The refraction factor of a lens material is 1.51.

In FIG. 2A, the light emitted from the semiconductor laser 2 enters the interference lens 1-3 via the collimator lens 1c. The light having passed through a portion of the lens, which is above the optical axis, is applied onto the display 100 via a beam path 2-3-1. Likewise, the light having passed through a portion of the lens, which is below the optical axis, is applied onto the display 100 via a beam path 2-3-2. The light reaching the same point (a point of interference) 5 on the display 100 is laser beams emitted from the same light source and therefore, causes interference. As above, the laser beams emitted from the single light source are projected onto the display as if they were laser beams, which were virtually emitted from two points of light sources 2-1, 2-2 in the plane of the optical axis. In this exemplary embodiment, light from a point light source is collimated by use of the collimator lens, and the thus-collimated light is caused to enter the lens. The collimated light can be considered to have a light source at infinity. The interference lens 1-3 virtually makes the light source at infinity be the two points of the light sources.

The center of the concentric interference pattern located on a continuation line of the optical axis of the interference lens 1-3 becomes an indicated point (an indicated position). As shown in FIG. 1, the detectors 10, 11 are located at corners of the display 100 to thereby detect segments of the concentric interference pattern 5. Each of the detectors 10, 11 may be equipped with an infrared-ray filter, which permits only light having wavelength longer than 850 nm to transmit therethrough. Light, such as an interior lamp, which causes noise can be blocked by means of the filter. A plurality of circular arcs, which are segments of the concentric interference pattern, are projected onto the detectors. The computer 12 performs image processing for the images of the circular arcs, to thus compute the center position of the concentric interference pattern 5.

Figure 3:
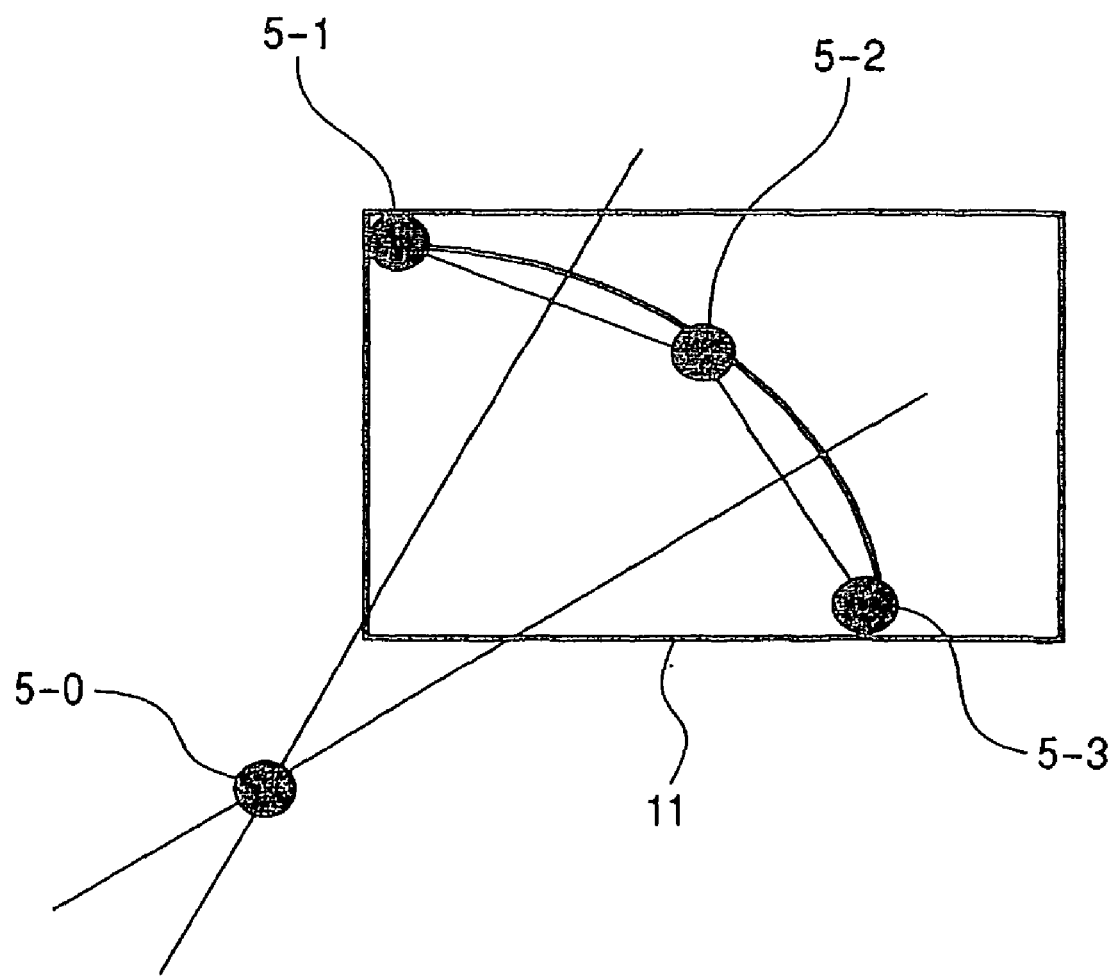
FIG. 3 is a view showing a method for determining a center of a concentric circle from a circular arc.

FIG. 3 shows a method for determining a concentric center from the circular arc. Three arbitrary points 5-1, 5-2, and 5-3 are selected from the circular arc, to thereby determine two line segments. From a mathematical theorem, a point of intersection between perpendicular bisectors of the respective line segments is a center 5-0 of the circle. The center of the circle is the point indicated by the pointer 3 (the indicated position). Three arbitrary points on the circular arcs can be extracted from all pieces of circular arc information detected by the detectors. The greater the number of points is, the greater noise components are cancelled. Thus, the point of center can be determined with high positional accuracy.

As mentioned above, the detectors 10, 11 are attached to the display 100, and detect concentric interference patterns; the computer computes the position indicated by the pointer 3; and the computer 12 sends to the display 100 a signal, which is used for moving the cursor to this computed position. As a result, the pointer 3 can be used in displaying a cursor, as an input interface with a computer. In this exemplary embodiment, two detectors are provided, but number of the detectors is not limited to two. That is, one detector or three or more detectors may be provided.

In this system, noise is eliminated from the positional coordinates of the position indicated by the pointer, to thus compute first positional coordinate values. The system again eliminates noise from the first positional coordinate values with using a noise removal parameter determined on the basis of the first positional coordinate values, to thus compute second positional coordinate values. On the basis of the second positional coordinate values, the position indicated by the pointer is determined. Considered below is a case where a person holds a pointer in his/her hand and gives a presentation while indicating a display device connected to the computer or a display screen projected by a projector, by means of the pointer. The cursor displayed at the indicated point moves in accordance with movement of the pointer. Vibration of the position indicated by the pointer, which would be induced by physical vibration such as shaking of the user's hand at this time, is restrained by the following method.

First Example

Figure 4:
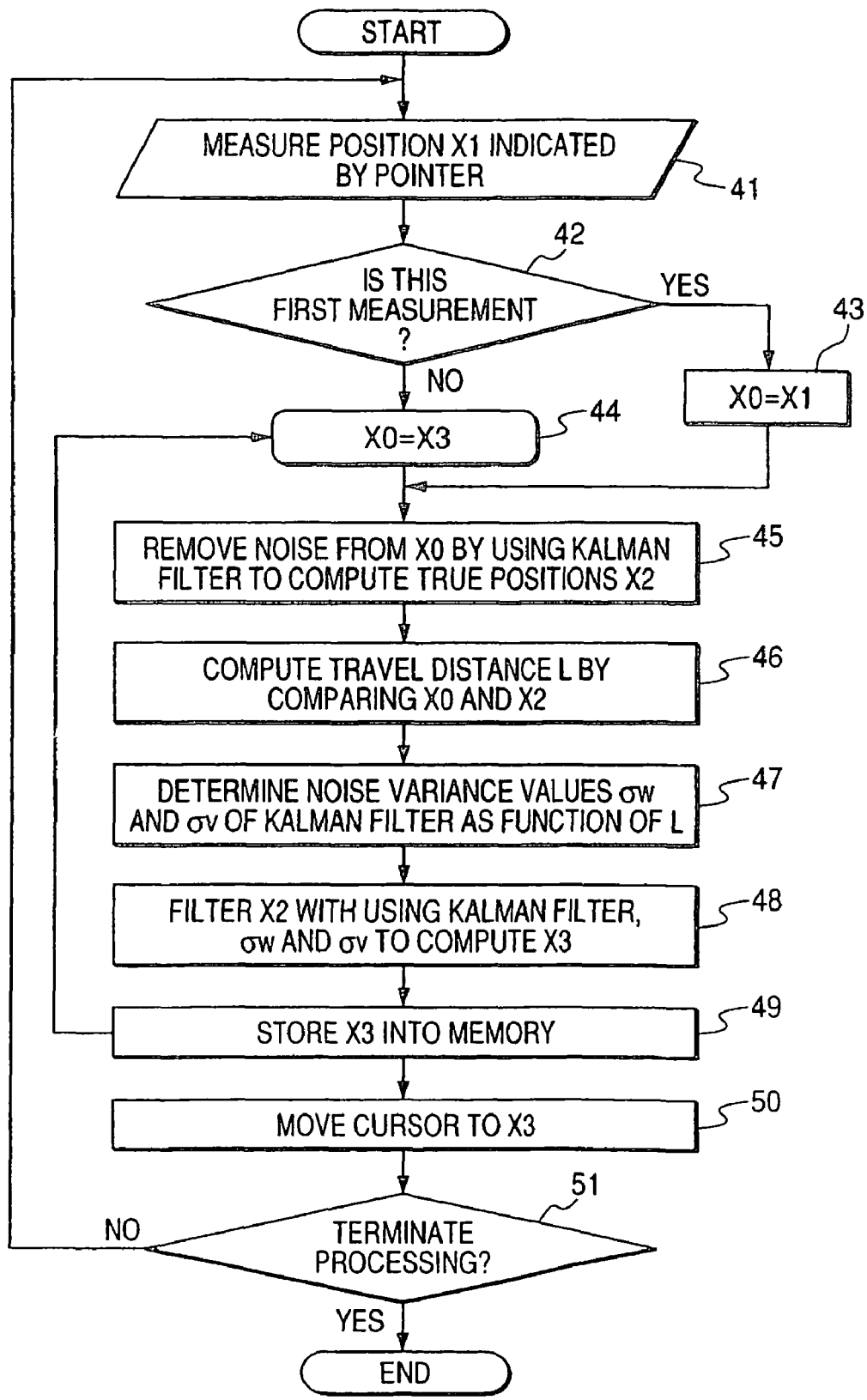
FIG. 4 is a flowchart showing an algorithm for eliminating noise in the position measurement system according to an exemplary embodiment of the invention.

FIG. 4 is a flowchart showing an example of an algorithm for eliminating noise in the position measurement system. In this example, a Kalman filter is used to eliminate noise. In FIG. 4, a position X1 indicated by the pointer is first measured in step 41. For instance, as has been described by reference to FIG. 3, the position X1 indicated by the pointer corresponds to coordinates of the center position of the concentric circle determined from circular arcs of the concentric interference pattern emitted from the pointer onto the display. This position indicated by the pointer is represented by coordinates (x, y) on the display screen. In step 42, a determination is made as to whether or not the indicated position X1 has first been measured. If the position has been measured for the first time, X0=X1 is set, and processing proceeds to step 45. If not, X0=X3 is set, and processing proceeds to step 45. Here, X0 designates a value to be compared, and X3 designates a previous computed value.

Next, in step 45 (functioning as the first noise removal unit), X0 (in the case of the first time, X1; otherwise X3) is filtered with the first Kalman filter, to thereby eliminate noise and compute a true position (true values) X2 (first positional coordinate values). A status vector $X_k$ of the Kalman filter is expressed by the following expression.

$$X_k = (x(k), y(k), v_x(k), v_y(k))^T \quad (1)$$

Here, x(k), y(k) designate positional coordinates of the point indicated at a time "k"; and $V_x(k)$, $V_y(k)$ designate a moving speed of the point indicated at time "k." The basic model of the Kalman filter is based on the common model provided below.

$$x_{K+1} = Fx_k + Gw_k \quad (2)$$
$$y_k = Hx_k + v_k$$

$$F = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \quad (3)$$

$$G = \begin{bmatrix} 0 & 0 & 1 & 0 \\ 0 & 0 & 0 & 1 \end{bmatrix}^T \quad (4)$$

$$H = \begin{bmatrix} 1 & 0 & 0 & 0 \\ 0 & 0 & 0 & 1 \end{bmatrix}$$

F denotes a status transition matrix; G denotes a drive matrix; and H denotes an observation matrix. $w_k$ denotes system noise, and $v_k$ denotes observation noise. Covariance matrices for the respective noises are expressed as follows:

$$\Sigma wk = \sigma_w^2 \cdot I_{2\times 2},$$

$$\Sigma vk = \sigma_v^2 \cdot I_{2\times 2}$$

In the expression, σw and σv are variance values, and $I_{2\times 2}$ signifies a unit matrix of 2×2.

Noise removal performed by the Kalman filter is carried out by computation of the status vector $X_k$. This computation is effected by sequentially executing the following recurrence formula.

$$\hat{x}_{k|k} = \hat{x}_{k|k-1} + K_k(y_k - H\hat{x}_{k|k-1}) \quad (6)$$
$$\hat{x}_{k+1|k} = F\hat{x}_{k|k}$$

$$K_k = \Sigma \hat{x}|k - 1 H_k^T (H_k \Sigma \hat{x}|k - 1 H_k^T + \Sigma vk)^{-1} \quad (7)$$

$$\hat{\Sigma} \hat{e}|\hat{e} = \hat{\Sigma} \hat{e}|\hat{e} - 1 - K_k H_k \hat{\Sigma} k|k - 1 \quad (8)$$

$$\hat{\Sigma} k + 1|k = F_k \cdot \hat{\Sigma} \hat{e}|\hat{e} \cdot F_k^T + G_k \cdot \Sigma wk \cdot G_k^T \quad (9)$$

where $$\hat{X}_{0|-1} = \overline{X}_{0'} \quad (10)$$

Symbol ^ indicates an estimated value.

As mentioned above, the first noise removal unit determines a status vector $X_{k|k}$, to thus initially eliminate first noise from the indicated position X0 measured at each measurement time "k." The thus-determined values are referred to as true values X2 (first positional coordinate values) of the indicated position. In step 46, X2 is compared with X0 (in the case of the first time, X1; otherwise, X3), to thus compute the amount of change. In this case, the travel distance L of the cursor is computed. The travel distance L is expressed by $$L = |X2 - X0| \quad (11)$$

where | | indicates an absolute value.

Noise variance value σw of system noise and noise variance value σv of observation noise of the Kalman filters are determined in accordance with the travel distance L. That is, when the travel distance L (the amount of change) is smaller than a reference value, the person indicates a specific location and it is preferable that the cursor is fixed. On the contrary, when the travel distance L (the amount of change) is greater than the reference value, the person is dynamically moving the pointer in order to indicate another location. Therefore, it is preferable that the cursor is moved quickly to track the movement of the pointer. To this end, in step 47, the noise variance values σw and σv of the Kalman filters are determined as a function of the travel distance L as follows:

$$\sigma w = L \times A \quad (12)$$

$$\sigma v = B/L \quad (13),$$

where A and B denote constants. As can be seen from expressions (5), (12), and (13), when a difference (a travel distance) L between X2 and X0 is smaller than the reference value, system noise is set so as to be small, and observation noise is set so as to be large. When the difference (a travel distance) L between X2 and X0 is greater than the reference value, system noise is set so as to be large, and observation noise is set so as to be small. The processing method is changed depending on whether L is greater than or smaller than the reference value. However, the reference value can be set, e.g., in order for the cursor position of the pointer to remain stationary or for the vibration of the cursor to be small enough for recognizing it by a person viewing the cursor. However, the reference value is not limited thereto and can be set freely. In relation to setting the system noise and the observation noise so as to become large or small, the parameter is set to a large value or a small value, which imparts a natural feeling to the person who views vibration of the cursor, as in the case mentioned above.

In step 48 (functioning as a second noise removal unit), the input signal is again filtered with the Kalman filters by using the noise variance values σw and σv as noise removal parameters, to thus compute a status vector $X_{k|k}$. Namely, X2 (the first positional coordinate values) is filtered with a second Kalman filter, to thus compute X3. In step 49, this value X3 (second positional coordinate values) is stored in memory. In step 44, X0=X3 is set, and the value is used for next noise removal processing. In step 50, the cursor is moved to the position indicated by the value X3. In step 51, a determination is made as to whether or not above processing is terminated. When processing is not terminated, processing returns to step 41, and the above processing is repeated. Through the above technique, when the person is indicating a specific location by the pointer, the cursor remains stationary without involvement shaking. In contrast, when the pointer is being moved, the cursor can quickly pursue the movement.

When the person holds the pointer by hand, the person's hand often shakes. Consequently, the cursor displayed on the display screen vibrates. Therefore, this system grasps the intention of the person from the true values of the indicated position, thereby preventing vibration of the cursor. In a situation where a certain position is indicated during a presentation utilizing a pointer, even when the person's hand shakes, the travel distance of the shaking hand frequently falls within a given range. Meanwhile, when another location is indicated, the travel distance of the indicated position becomes great, and hence movement can be distinguished from vibration due to a shaking hand.

Second Example

In this example, a filter, which attenuates a value measured in the past in the manner of an exponential function, is used as the first filter for removing noise. As in the case of the first embodiment, a Kalman filter is used for the second filter. Coordinates of the cursor measured "$n^{th}$" time since initiation of measurement are taken as $(x_n, y_n)$. An attenuation coefficient is taken as "a," and the value obtained as a result of removal of noise is taken as (x, y). Coordinates (x, y) are computed as follows.

$$x = \left( \begin{array}{c} x_1((a-1)/a)^n + x_2((a-1)/a)^{n-1} + \\ x_3((a-1)/a)^{n-2} + \ldots + x_n \end{array} \right) / a \quad (14)$$
$$= \Sigma_{i=1}^n x_i ((a-1)/a)^{n-1} / a$$

$$y = \left( \begin{array}{c} y_1((a-1)/a)^n + y_2((a-1)/a)^{n-1} + \\ y_3((a-1)/a)^{n-2} + \ldots + y_n \end{array} \right) / a \quad (15)$$
$$= \Sigma_{i=1}^n y_i ((a-1)/a)^{n-1} / a$$

Numerical subscripts 1, 2, 3 . . . denote the number of $i^{th}$ frames. For instance, provided that an attenuation coefficient is set to a=5, coordinates (x, y) at the n=$100^{th}$ frame are determined as follows:

$$x = (x_1(4/5)^{100} + x_2(4/5)^{99} + x_3(4/5)^{98} + \ldots + x_{100})/5 \quad (16)$$

$$y = (y_1(4/5)^{100} + y_2(4/5)^{99} + y_3(4/5)^{98} + \ldots + y_{100})/5 \quad (17)$$

An algorithm of this computation is simple, and if the following expressions are repeated for every "i" frame:

$$x_{array} = x_{array}(a-1)/a + x_i/a \qquad (18)$$

$$y_{array} = y_{array}(a-1)/a + y_i/a \qquad (19).$$

the above geometric series are obtained. Measured values are computed by use of such noise removal unit. A difference (travel distance) L between these values and previously-measured values is computed according to Equation (11). Subsequently, as in the case of the first example, the moving speed of the cursor is set as indicated by Equations (12), (13), by using the Kalman filter. Thus, as in the case of the first example, the cursor can be moved by taking the operator's intention into consideration.

Third Example

In this example, system noise $\sigma v$ of the Kalman filter represented by Equation (11) and the observation noise $\sigma w$ are used for the function of a measurement position. In this example, the first Kalman filter is set so as to assume noise variance values $\sigma v = 1$ and $\sigma w = 100$, and noise is first eliminated. Next, from Equation (11), the travel distance L of the cursor is computed. In relation to the travel distance L, the second Kalman filter is set so as to assume noise variance values $\sigma v0 = 10^{-6}$ and $\sigma w0 = 10^{6}$, the following functions are employed.

$$\sigma v0 = \sigma v0 \times L \qquad (20)$$

$$\sigma w0 = \sigma w0/L \qquad (21)$$

Figure 5:
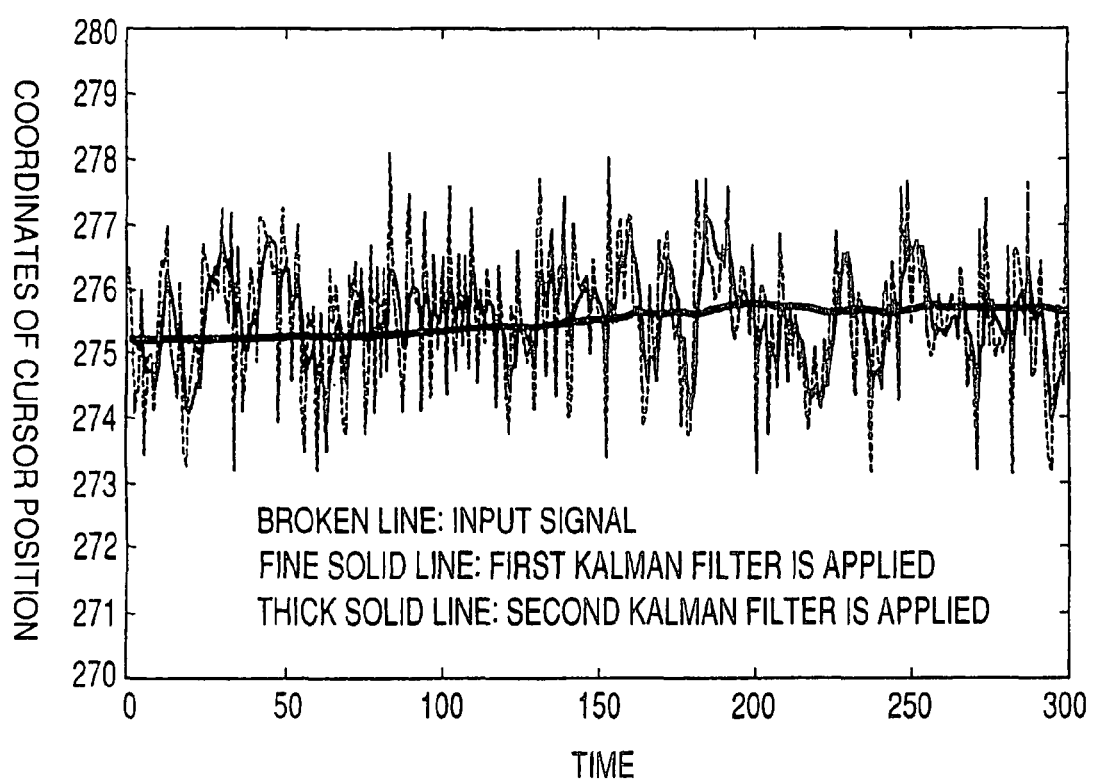
FIG. 5 is a graph showing time change in coordinates of a cursor position obtained from an input signal, a signal, which is subjected to a first Kalman filter, and a signal, which is further subjected to a second Kalman filter.

The Result are shown in FIG. 5.

FIG. 5 is a graph showing variations in respective images at coordinates of cursor positions acquired when an input signal is subjected to the first Kalman filter and when the input signal is further subjected to the second Kalman filter. The horizontal axis of the graph represents a frame number (time) of an image, and the vertical axis of the same represents a "y" coordinate of the coordinates (x, y) of the cursor position on an image. Here, the input signal corresponds to the coordinates of the center position of the concentric circle (the coordinates of the cursor position acquired before elimination of noise) determined from the concentric interference pattern. As illustrated, noise in the input signal shows intense vertical vibration as indicated by a broken line. When this filter is subjected to the first Kalman filter, a given amount of noise is eliminated as indicated by a fine solid line, whereby vertical vibration is alleviated. When this signal is further subjected to the second Kalman filter, noise is eliminated in a more superior manner as indicated by a thick solid line, whereby vertical vibration is understood to be dampened.

The above embodiments can be fulfilled by use of, e.g., a computer program. According to the invention, a filtering parameter is set in accordance with the operator's intention. Hence, quick movement of the target point can be pursued. Concurrently, when the target point is stationary, noise is thoroughly eliminated, and true values can be made stationary.

What is claimed is:

1. A position measurement system comprising:
   an indicator that projects light of a concentric interference pattern;
   a detector that detects the light of the interference pattern projected by the indicator; and
   a computing device that determines positional coordinates of a center of light of an interference pattern projected onto a target object on a basis of a signal obtained from the detector, the computing device removing noise from the determined positional coordinates to compute first positional coordinate values, the computing device again removing noise from the first positional coordinate values using a noise removal parameter determined on a basis of the first positional coordinate values to compute second positional coordinate values, the computing device determining an indicated position of the indicator on a basis of the second positional coordinate values.

2. The system according to claim 1, wherein:
   a Kalman filter is used for computing the first positional coordinate values and the second positional coordinate values, and
   the noise removal parameter of the second noise removal unit includes system noise and observation noise.

3. The system according to claim 1, further comprising:
   a display connected to the computing device, wherein the indicated position of the indicator is displayed as a cursor on the display.

4. The system according to claim 3, wherein:
   when an amount of changes obtained by comparing the first positional coordinate values with previous first positional coordinate values is smaller than a reference value, the cursor is fixed; and
   when the amount of changes is greater than the reference value, the cursor is moved to the second positional coordinate values.

* * * * *